United States Patent [19]

Ou-Yang

[11] Patent Number: 4,623,392
[45] Date of Patent: Nov. 18, 1986

[54] PRINTING INK

[75] Inventor: David T. Ou-Yang, Cottage Grove, Minn.

[73] Assignee: Minnesota Mining and Manufacturing Company, St. Paul, Minn.

[21] Appl. No.: 436,379

[22] Filed: Oct. 25, 1982

[51] Int. Cl.$^4$ ............................................. C09D 11/02
[52] U.S. Cl. ........................................ 106/27; 106/30
[58] Field of Search ............................... 106/30, 29, 27

[56] References Cited

U.S. PATENT DOCUMENTS

| | | | |
|---|---|---|---|
| Re. 30,212 | 2/1980 | Carder | 106/20 |
| 3,037,871 | 6/1962 | Floyd et al. | 106/26 |
| 3,224,893 | 12/1965 | Floyd et al. | 106/316 |
| 3,244,734 | 4/1966 | Sonntag | 260/404 |
| 3,245,825 | 4/1966 | Fessler et al. | 117/38 |
| 3,253,940 | 5/1966 | Floyd et al. | 106/316 |
| 3,261,787 | 7/1966 | Davies et al. | 260/25 |
| 3,642,729 | 2/1972 | Wismer et al. | 260/80.7 |
| 4,104,219 | 8/1978 | Peters et al. | 260/29.6 RB |
| 4,111,878 | 9/1978 | Ruhf | 260/29.6 ME |
| 4,148,944 | 4/1979 | Ruhf | 427/256 |
| 4,243,702 | 1/1981 | Walsh | 427/256 |
| 4,256,494 | 3/1981 | Yamamoto et al. | 106/22 |
| 4,327,147 | 4/1982 | Ou-Yang | 156/69 |

FOREIGN PATENT DOCUMENTS

| | | |
|---|---|---|
| 127214 | 9/1977 | German Democratic Rep. |
| 47462 | 4/1981 | Japan |
| 106927 | 8/1981 | Japan |
| 59961 | 4/1982 | Japan |

Primary Examiner—Amelia B. Yarbrough
Attorney, Agent, or Firm—Donald M. Sell; James A. Smith; David L. Weinstein

[57] ABSTRACT

A composition for preparing a printing ink. The composition comprises
(a) a vehicle or binder, which comprises at least two resins which are compatible, one of which resins is a polyvinyl acetal or a dibasic acid-modified rosin ester,
(b) a release agent,
(c) a solvent for the vehicle and release agent, and
(d) a colorant.

The ink is particularly useful for printing on a substrate of polystryrene foam. The composition may be used without the colorant, in which case it can be used for providing a release coating on a substrate.

8 Claims, No Drawings

PRINTING INK

BACKGROUND OF THE INVENTION

This invention relates to the field of printing inks, and in particular, to solvent-based inks for flexographic printing processes.

Printing inks such as flexographic inks are solvent-based inks applied by rubber rollers or pads to flexible sheets of plastic, foil, and paper. Many printing processes have been developed in the past and are available for printing on a wide number of surfaces. With the recent development of plastic films and the uses of such materials in packaging, flexographic inks have come into greater prominence because the equipment used for flexographic printing offers a useful and convenient method for printing on such plastic surfaces. Certain classes of plastic films are smooth, non-porous in the main, and very thin (of the order 50 to 76 micrometers thick). For these reasons, they do not have enough "give" for smooth printing from hard metal plates, and special flexographic printing from rubber plates is preferred. In addition, other classes of substrates, e.g. polymeric foams, are highly compressible, and printing from rubber plates by way of a flexographic printing process is preferred for this type of substrate.

The selection of resins or polymers as the binder for flexographic inks depends on the printing process, the solvent, and, most important, the substrate to be printed and the ultimate use of the printed matter.

Some of the desirable properties of a resin binder in flexographic printing inks are as follows:

(1) The resin should adhere well to plastic films to give high gloss, rapid dry, and a resistant attractive surface;
(2) The resin should be stable on aging or chilling;
(3) The resin should be compatible with the many modifying agents which may be used;
(4) In inks which are applied with rubber rollers, such as flexographic inks, the resin should be soluble in solvents which do not attack rubber rollers.

Polystyrene foam is frequently used as cap liners for containers, place mats, cartons for food, and the like. It is often desired by the manufacturer of the foregoing products to print trademarks, product information, advertising copy, or other information on these products. When ink is applied to the side of the foam which is to bear the information, transfer of ink to the reverse side of the foam can, and is likely to, occur under certain conditions of storage. This type of ink transfer is referred to as "set-off". Set-off can occur if the foam is stored in the form of a roll after printing. If the roll is tightly wound, the printed side of the foam contacts the reverse side of the foam under a high compressive force, resulting in transfer of a portion of the ink from the printed side to the reverse side. Set-off can also occur if printed foam sheets are stored in the form of a stack. Ink from the printed side of a given sheet can transfer to the unprinted side of the sheet immediately overlying it. Set-off may be aggravated when the printed side of the foam comes in contact with an adhesive-bearing surface. For example, polystyrene foam webs for container cap liners frequently bear an adhesive on the imprinted side. When stored in the roll, the adhesive has a tendency to pick off the ink from the printed side of the web. In some cases, the ink on the foam can be rubbed off under light or moderate rubbing friction. For example, the user of a foam place mat can easily rub off ink from the printed surface of the mat by brushing his hand over that surface.

A conventional inked surface may be overcoated with silicone release liner in order to prevent ink transfer. However, such a release liner is extremely expensive, e.g. the liner can double the cost of a printed article.

SUMMARY OF THE INVENTION

The foregoing deficiencies are overcome by the compositions of this invention which comprise
(a) a vehicle or binder, which comprises at least two resins which are compatible, one of said resins being a polyvinyl acetal or a dibasic acid-modified rosin ester,
(b) a release agent,
(c) a solvent for the vehicle and release agent, and
(d) a colorant,
The composition may also be used without the colorant, in which case it would function as a release coating.

The ink formed from the composition exhibits good adhesion and printability on substrates made of metal, paper, and polymeric materials, including polymeric foams such as polystyrene and polyvinylchloride. The ink compositions of the present invention print exceptionally well on porous, highly compressible substrates, particularly on polystyrene foam.

The dried composition functions as a release coating against foreign substrates that come in contact with it, including such substrates as those bearing pressure sensitive adhesives and shear-activated adhesives. The composition is also highly resistant to being rubbed off by light or moderate friction.

DETAILED DESCRIPTION

The main function of the resin vehicle, or binder, is to provide adhesion for the colorant to the printed surface after the solvent has evaporated. A second function of the vehicle is to prevent the release agent from migrating from the printed surface.

It is required that at least two resins be used to make up the vehicle, or binder. All of the resins of the vehicle must be compatible, i.e. they must be capable of being mixed together without undergoing separation or reaction. At least one of the resins must function as an adhesive on the substrate to be printed. The other resin or resins function as a barrier to bind the release agent, which has the tendency to migrate to the surface of the coating. In the absence of the release agent binder, the release agent would ultimately migrate to the surface of the coating, from which it could be rubbed away, and the release characteristic of the coating consequently would deteriorate.

At least one of the resins in the vehicle should be a polyvinyl acetal or a dibasic acid-modified rosin ester. The other resin or resins may be chosen from resins that are conventionally used in flexographic printing processes. Examples of these resins include polyamides, nitrocelluloses, fatty alcohols, acrylics, and rosins and their derivatives. These resins should be soluble in lower alcohols, e.g., ethanol, or in mixtures of lower alcohols and other hydrocarbon solvents and/or esters. Properties of resins useful for flexographic printing processes are described in Encyclopedia of Polymer Science and Technology, Volume 11, Interscience Publishers (1969), pp. 581–584. Regardless of how many resins are employed, they must be compatible with themselves and with the polyvinyl acetal or dibasic acid-modified rosin ester employed.

Polyvinyl acetals are prepared from aldehydes and polyvinyl alcohols. Polyvinyl alcohols are high molecular weight synthetic resins containing various percentages of hydroxyl and acetate groups produced by hydrolysis of polyvinyl acetate. Polyvinyl alcohols are usually classified as partially hydrolyzed (15–30% polyvinyl acetate groups) and completely hydrolyzed (0–5% acetate groups). It is preferred that the polyvinyl acetal be selected from acetals that are soluble in conventional solvents for flexographic printing, e.g., lower alcohols alone or in combination with hydrocarbon solvents and esters. Polyvinyl butyral, which is soluble in ethanol, is the most preferred polyvinyl acetal. Other commercially available polyvinyl acetals are not soluble in alcohol. However, these alcohol-insoluble polyvinyl acetals, e.g., polyvinyl formal, would be useful in the vehicle if a suitable solvent were to be employed. Polyvinyl butyrals which are useful in this invention should have a solution viscosity equal to or less than 1000 cps (10% solution in 95% ethanol at 25° C., using an Ostwald viscometer). They should also have a weight average molecular weight not in excess of 55,000 (as determined by fractionating reacetylated samples of polyvinyl alcohols). Dibasic acid-modified rosin esters which are useful in this invention are pentaerythritol esters of rosin.

There are a great number of commercially available resins that are suitable for use in the composition of this invention. Examples of these resins include, but are not limited to, the following:

| | | |
|---|---|---|
| Polyvinyl acetals | Butvar ® B-79 | Monsanto Company |
| | Butvar ® B-98 | Monsanto Company |
| Polyamides | Versamid ® 744 | Henkel |
| | Versamid ® 940 | Henkel |
| Acrylics | Elvacite ® 2044 | E. I. duPont de Nemours & Co. |
| | Acryloid ® B-72 | Rohm and Haas Co. |
| Hydrogenated rosin ester | Foral ® 85 | Hercules, Inc. |
| Dibasic acid-modified rosin ester | Pentalyn ® 261 | Hercules, Inc. |

The function of the release agent is to improve slip and antiblock properties of the coating prepared from the composition.

Release agents which may be used in the coating include fatty amides and fatty acids, i.e., carboxylic acids. The fatty amides or fatty acids should be soluble in the solvents which are to be used for the composition. Suitable fatty acids include aliphatic monocarboxylic acids having from 6 to 22 carbon atoms. Suitable fatty amides include those amides having from 6 to 22 carbons. The preferred fatty acid is stearic acid. The preferred fatty amides are oleamide and stearamide.

Commercially available fatty amides which are useful in this invention include Kemamide ®U and Kemamide ®S, both available from Witco Chemical Co. A commercially available fatty acid that is suitable for this invention is Hystrene ®9718 NFFG, available from Witco Chemical Co.

The compositions may be given any desired color by grinding pigments and/or dissolving organic dyes in the base compositions. For example, black inks can be made with carbon black, white inks with titanium dioxide, blue inks with Iron Milori Blue, red inks with Barium Lithol Red. The composition may also be used without a colorant. In this case, the resulting coating acts as a release coating.

The function of the solvent is two-fold: it must impart fluidity to the whole system and also permit rapid drying. Fluidity is important because pigments, dyes, resins, which are normally solids, must be transformed to highly fluid inks suitable for application by rollers and plates to a wide variety of surfaces. Following its application to the printed surface, the ink must dry almost immediately so that rewinding into rolls can take place at high speed without offsetting or sticking.

The solvent most generally used in flexographic inks is a monohydric alcohol, or mixtures of monohydric alcohol with glycol-ethers or glycols. The reason for this selection is very important since the flexographic press depends upon rubber rollers and rubber plates to distribute and apply the ink to the moving web of paper, film, foil, etc. Since rubber forms an integral part of the press, the solvent in the ink must not cause the rubber to soften, swell or distort. Most of the esters, ketones, and hydrocarbons affect natural or synthetic rubber of the moldable type, and, except for the alcohols, glycols, glycol-ethers, and water, very few solvents will be found that do not harm rubber plates. Ester, ketone, and hydrocarbon solvents can be used in combination with alcoholic solvents to improve certain properties of the solution, such as solubility, viscosity, etc. However, only a low percentage should be used to avoid the deterioration of the printing plate. Other solvents may be used if the rollers and plates of the flexographic press are made of materials which are not harmed by these solvents, or if other coating or printing techniques are employed.

Solvents for the ink compositions should be very volatile solvents such as low boiling point alcohols, glycol ethers, esters, aliphatic hydrocarbons such as ketones and naphthas, and nitroparaffins. Mixtures of the foregoing solvents may also be employed. Suitable solvents are listed in Kirk-Othmer Encyclopedia of Chemical Technology, 3d ed., vol. 13, John Wiley & Sons (1981), Table 3, p. 387. Examples of suitable alcohols are methyl alcohol, isopropyl alcohol, n-propyl alcohol, and n-butyl alcohol. Examples of suitable glycol ethers are Cellosolve ®, and methyl Cellosolve ®. Esters such as ethyl acetate, n-propyl acetate, n-butyl acetate, and Cellosolve ® acetate may be used as part of a solvent mixture, but the ester content should not exceed 25% of the flexographic solvent. Ketones, such as methyl ethyl ketone, can be used with butyl rubber plates and rollers. Naphthas are acceptable for flexographic printing with buna rubber plates and rollers. The preferred class of solvents is a mixture of at least one alcohol and at least one ester. For example, a solvent containing about 80 weight percent ethanol and 20 weight percent ethyl acetate is particularly preferred, on account of superior solubility and consequent printability results.

The first step in the preparation of the flexographic ink involves dissolving the solids in the solvent. This is usually accomplished by running the required weight or volume of solvent into a stainless steel vessel, equipped with a high-speed, explosion-proof, electric agitator, and then adding slowly the proper amount of resins, and release agent, stirring constantly during the addition. Occasionally, the vessels are steam-jacketed and the solvent is raised to a slightly elevated temperature to facilitate the solution of the resin vehicle and release agent. In either case, agitation is continued until the solids are in complete solution, whereupon the resulting solution is strained to remove any foreign matter or small insoluble particles. As stated previously, two or more compatible, alcohol-soluble resins are mixed with at least one alcohol-soluble release agent. The concentration of the resins in the solids portion of the soluble should be about 50 to about 90 weight percent; the concentration of release agent in the solids portion of the solution should be about 10 to about 50 weight percent. After the solution is strained or filtered, it can then be run into storage tanks to await use.

The next step is that of incorporating the required amount of dyes, pigments, modifiers, etc., into the vehicle-containing solution. If the ink is to contain dyes only as the coloring matter, these may be weighed and sifted slowly into the vehicle, while agitating with a high-speed mixer. Usually, the inks are made somewhat stronger and heavier in consistency than required to permit let down, or diluting, with diluent, to the correct finished strength and viscosity as required by the customer. If the ink is to contain pigments, the required amount of vehicle-containing solution can be weighed into a ball mill and the established weight of each pigment is added. The charge of balls should be at least ¼, and preferably ⅜ the volume of the empty mill to insure good dispersion of the pigments. Steel balls are used for all colors except white and yellow, when either porcelain balls or pebbles are used. When all the materials are in the mill, the cover is clamped on, the motor started and the dispersing, i.e., grinding, continued until satisfactory dispersion is obtained, as determined by drawing down a sample of the ink on a "fineness of grind" gauge. A sand mill may be used in lieu of a ball mill. The amount of pigment, if used, may range from about 10 to about 70 weight percent, based on the weight of the resin/release agent mixture.

The amount of solids in the composition, excluding the pigment, should be from about 15 to about 35 weight percent, based on the total weight of solids and solvent. If the solvent includes a co-solvent in addition to an alcohol, the amount of alcohol in the solvent mixture should equal or exceed 60 percent, based on the total weight of the solvent.

Printing plates for the ink of this invention may be of natural rubber, neoprene, or elastomeric photopolymers. The preferred printing plate is an elastomeric photopolymer.

The use of a colorant is not critical to the invention. As stated previously, the composition can be used unpigmented as a release coating.

When used as printing inks, the compositions of this invention may be printed by any of the conventional printing processes including flexographic, gravure, lithographic, and letter press. Printing may be roll-fed or sheet-fed and the substrate may be paper, board, fabric, metal, glass, plastic, wood, foam or the like. The composition of this invention is particularly desirable for porous, highly compressible substrates such as polystyrene foam.

In addition to printing, the compositions may be applied to substrates by roll-coating, doctoring, screening, dipping, or the like.

The present invention is further described by the following examples.

EXAMPLE I

A flexographic ink base was prepared from the following ingredients:

| Ingredient | Parts by Weight |
| --- | --- |
| Polyvinyl butyral (Butvar ® B-79, Monsanto Company) | 12 |
| Polyamide (Versamid ® 744, Henkel) | 4 |
| Oleamide (Kemamide ® U, Witco Chemical Co.) | 4 |
| Ethanol | 48 |
| n-Propanol | 16 |
| Ethyl acetate | 8 |
| n-Butyl acetate | 8 |

The ingredients making up the solvent, ethanol, n-propanol, ethyl acetate, and n-butyl acetate, were introduced into a stainless steel vessel in a well-ventilated area. The ingredients making up the vehicle, polyvinyl butyral and polyamide, and the release agent, oleamide, were slowly added to the vessel while moderately agitating the solution until a true solution had formed. Five parts by weight carbon black was ground into the ink base with a sandmill.

The ink composition was applied to a substrate by means of a flexographic printing apparatus at a temperature of about 55° C. at a coating speed of about 91 m/min and subsequently allowed to cool to room temperature (25° C.) to provide a coating in the range of 0.15 mg/cm$^2$ to 1.5 mg/cm$^2$ on the substrate. The substrate was a polystyrene foam having a thickness of about 500 micrometers.

EXAMPLE II

A flexographic ink base was prepared from the following ingredients:

| Ingredient | Parts by Weight |
| --- | --- |
| Dibasic acid-modified rosin ester (Pentalyn ® 261, Hercules, Inc.) | 9 |
| Polyamide (Versamid ® 940, Henkel) | 6 |
| Stearic Acid (Hystrene ® 9718 NFFG, Witco Chemical Co.) | 5 |
| Ethanol | 64 |
| Ethyl acetate | 16 |

The ingredients making up the solvent, ethanol and ethyl acetate, were introduced into a stainless steel vessel. The vehicle ingredients, dibasic acid-modified rosin ester and polyamide, and the release agent, stearic acid, were added to the vessel while moderately agitating the solution until a true solution had formed. Five parts by weight carbon black was ground into the ink base with a ball mill.

The ink composition was applied to a substrate by means of a flexographic printing apparatus at a temperature of about 62° C. at a coating speed of about 61 m/min and subsequently allowed to cool to room temperature (25° C.) to provide a coating in the range of 0.15 mg/cm$^2$ to 1.5 mg/cm$^2$ on the substrate. The substrate was a polyvinyl chloride having a thickness of about 76 micrometers.

EXAMPLE III

A flexographic ink base was prepared from the following ingredients:

| Ingredient | Parts by Weight |
| --- | --- |
| Polyvinyl butyral (Butvar ® B-98, Monsanto Company) | 4 |
| Hydrogenated rosin ester | 9 |

-continued

| Ingredient | Parts by Weight |
| --- | --- |
| (Foral ® 85, Hercules, Inc.) | |
| Oleamide (Kemamide ® U, Witco Chemical Co.) | 7 |
| Ethanol | 64 |
| Ethyl acetate | 16 |

The solvent ingredients, ethanol and ethyl acetate, were introduced into a stainless steel vessel. The ingredients making up the vehicle, polyvinyl butyral and hydrogenated rosin ester, and the release agent, oleamide, were added to the vessel while moderately agitating the solution until a true solution had formed. Five parts by weight carbon black was ground into the ink base with a dispersion mixer (Polymill ®, manufactured by Day Mixing Co, Cincinnati, Ohio).

The ink composition was applied to a substrate by means of a flexographic printing apparatus at a temperature of about 62° C. at a coating speed of about 61 m/min and subsequently allowed to cool to room temperature (25° C.) to provide a coating in the range of 0.15 mg/cm² to 1.5 mg/cm² on the substrate. The substrate was aluminum foil having a thickness of about 50 micrometers.

The printing inks were tested for set-off by means of the following test procedure:
(1) Sheets of polystyrene foam having a thickness of 500 micrometers were coated with the composition to be tested by a #4 Meyer bar.
(2) 5 cm.×5 cm. squares were cut from the sheet.
(3) The coated side of one of the squares was placed in contact with the uncoated side of another of the squares; the uncoated side had been previously coated with a shear-activated adhesive.
(4) The contacted squares were placed between two metal (aluminum) plates, the resulting sandwich was placed on a flat horizontal surface, and a pressure of 70 g/cm² in. was applied to the sandwich. The temperature was held constant at 52° C., and the relative humidity held constant at 70%.
(5) After a period of 24 hours had elapsed, the contacted squares were removed from the pressure-applying device, allowed to cool at room temperature for 30 minutes, and were then peeled apart. If the ink did not transfer from the surface coated with the ink composition to the adhesive coated surface, the ink composition was considered acceptable.

The results of the foregoing test procedure are set forth in Table I. Compositions A through J were prepared by introducing the solvent into a stainless steel vessel, then adding to the vessel with stirring, the resin, and in the case of compositions F through J, the release agent. Carbon black was added to the ink base by means of a sand mill. Compositions K, L and M correspond to Examples I, II, and III, repectively.

TABLE I

| Composition | Ingredients | Parts by Weight | Test Result |
| --- | --- | --- | --- |
| A | Polyvinyl butyral | 13.00 | Transfer |
|   | Solvent A | 87.00 |   |
|   | Carbon black | 3.25 |   |
| B | Polyamide | 13.00 | Transfer |
|   | Solvent A | 87.00 |   |
|   | Carbon black | 3.25 |   |
| C | Acrylic ester resin | 13.00 | Transfer |
|   | Solvent A | 87.00 |   |
|   | Carbon black | 3.25 |   |
| D | Nitrocellulose (¼ sec) | 13.00 | Transfer |
|   | Solvent A | 87.00 |   |
|   | Carbon black | 3.25 |   |
| E | Dibasic acid-modified rosin ester | 13.00 | Transfer |
|   | Solvent A | 87.00 |   |
|   | Carbon black | 3.25 |   |
| F | Polyvinyl butyral | 12.00 | No ink set-off; shear activated adhesive lost its adhesion properties |
|   | Oleamide | 8.00 |   |
|   | Solvent A | 80.00 |   |
|   | Carbon black | 3.00 |   |
| G | Polyamide | 18.75 | Transfer |
|   | Oleamide | 6.25 |   |
|   | Solvent A | 80.00 |   |
|   | Carbon black | 3.25 |   |
| H | Acrylic ester resin | 15.00 | Transfer and serious blocking |
|   | Oleamide | 5.00 |   |
|   | Solvent A | 80.00 |   |
|   | Carbon black | 3.75 |   |
| I | Nitrocellulose (¼ sec) | 15.00 | Transfer |
|   | Oleamide | 5.00 |   |
|   | Solvent A | 80.00 |   |
|   | Carbon black | 3.75 |   |
| J | Dibasic acid-modified rosin ester | 15.00 | Transfer |
|   | Oleamide | 5.00 |   |
|   | Solvent A | 80.00 |   |
|   | Carbon black | 3.75 |   |
| K | Polyvinyl butyral | 12.00 | No Transfer |
|   | Polyamide | 4.00 |   |
|   | Oleamide | 4.00 |   |
|   | Solvent B | 80.00 |   |
|   | Carbon black | 5.00 |   |
|   | (Example I) |   |   |
| L | Dibasic acid-modified rosin ester | 9.00 | No Transfer |
|   | Polyamide | 6.00 |   |
|   | Stearic acid | 5.00 |   |
|   | Solvent A | 80.00 |   |
|   | Carbon black | 5.00 |   |
|   | (Example II) |   |   |
| M | Polyvinyl butyral | 4.00 | No Transfer |
|   | Hydrogenated rosin ester | 9.00 |   |
|   | Oleamide | 7.00 |   |
|   | Solvent A | 80.00 |   |
|   | Carbon black | 5.00 |   |
|   | (Example III) |   |   |

Polyvinyl butyral was Butvar ®B-79 from Monsanto Company.
Polyamide was Versamid ®744 from Henkel.
Acrylic ester resin was Acryloid ®B-72 from Rohm & Haas Co.
Nitrocellulose (¼ sec) was from Hercules, Inc.
Dibasic acid-modified rosin ester (pentaerythritol esters of rosin) was Pentalyn ®261 from Hercules, Inc.
Solvent A was 80% ethanol/20% ethyl acetate.
Solvent B was 60% ethanol/20% n-propanol/10% ethyl acetate/10% n-butyl acetate.
Oleamide was Kemamide ®U from Witco Chemical Co.
Stearic acid was Hysterene ®9718 NFFG from Witco Chemical Co.
Hydrogenated rosin ester was Foral ®85 from Hercules, Inc.

From the results of Table I, it can be seen that Compositions K, L, and M, which correspond to Examples I, II, and III, respectively, did not exhibit set-off, i.e., unwanted ink transfer, under the standard test employed. Compositions A, B, C, D, and E, all of which contained one resin and no release agent, exhibited set-off. Compositions G, H, I, and J, all of which contained one resin and a release agent, also exhibited set-off. Composition F did not exhibit set-off. However, the shear-activated adhesive lost its adhesion properties. Compositions K, L, and M did not bring about this undesirable result.

What is claimed is:

1. A composition of matter useful for coating substrates comprising
   (a) a vehicle which comprises at least two resins which are compatible, one of said resins being selected from the group consisting of polyvinyl acetals and dibasic acid-modified rosin esters,
   (b) a release agent selected from the group consisting of fatty acids and fatty amides, and
   (c) a solvent for the vehicle and release agent, said solvent being suitable for flexographic printing processes.

2. The composition of claim 1 wherein the polyvinyl acetal is polyvinyl butyral.

3. The composition of claim 1 wherein the dibasic acid-modified rosin ester is a pentaerythritol ester of rosin.

4. The composition of claim 1 wherein the solvent comprises at least one alcohol.

5. The composition of claim 4 wherein said at least one alcohol comprises at least about 60 percent by weight of the solvent.

6. The composition of claim 1 and further including a colorant.

7. The composition of claim 1 wherein said vehicle and said release agent together comprise from about 15 to about 35 weight percent of the composition, based on the total weight of the composition.

8. The composition of claim 6 wherein the concentration of the colorant is from about 10 to about 70 percent, by weight, of the combined weight of the vehicle and release agent.

* * * * *